(12) United States Patent
Nothum, Jr.

(10) Patent No.: US 11,953,361 B2
(45) Date of Patent: Apr. 9, 2024

(54) PRODUCTION FLOW-RATE MEASUREMENT OPTIONS FOR FOOD PROCESS LINES

(71) Applicant: Robert G. Nothum, Jr., Willard, MO (US)

(72) Inventor: Robert G. Nothum, Jr., Willard, MO (US)

( * ) Notice: Subject to any disclaimer, the term of this patent is extended or adjusted under 35 U.S.C. 154(b) by 84 days.

(21) Appl. No.: 17/724,799

(22) Filed: Apr. 20, 2022

(65) Prior Publication Data

US 2022/0244086 A1 Aug. 4, 2022

Related U.S. Application Data

(63) Continuation of application No. 16/910,568, filed on Jun. 24, 2020, now abandoned, which is a
(Continued)

(51) Int. Cl.
*G01F 13/00* (2006.01)
*A22C 21/00* (2006.01)
(Continued)

(52) U.S. Cl.
CPC ........ *G01F 13/003* (2013.01); *A22C 21/0053* (2013.01); *B65G 17/26* (2013.01); *B65G 43/10* (2013.01)

(58) Field of Classification Search
CPC . B65G 21/08; B65G 2201/0202; A23P 20/12; A23P 20/13; A23P 20/17;
(Continued)

(56) References Cited

U.S. PATENT DOCUMENTS

| 3,689,958 A | 9/1972 | Dillon ................ A22C 21/0007 |
| 4,132,156 A | 1/1979 | Glaze, Jr. ................ B31B 50/00 |

(Continued)

FOREIGN PATENT DOCUMENTS

| DE | 10 2004 062 137 | 2/2006 | ............... A23G 3/20 |
| DE | 20 2009 016 645 | 5/2011 | ............. B65G 47/08 |

(Continued)

OTHER PUBLICATIONS

NL Search Report, Appln. No. NL 2020691 dated Jan. 15, 2019.

*Primary Examiner* — Sarang Afzali
*Assistant Examiner* — Darrell C Ford
(74) *Attorney, Agent, or Firm* — Jonathan A. Bay

(57) ABSTRACT

A transfer conveyor for food process lines has an endless conveyor belt characterized by an upper, food-product carrying run and a lower, return run. The upper, food-product carrying run defines a transit plane. The upper, food-product carrying run also extends between an intake end and a discharge end. The upper, food-product carrying run furthermore has a first pleat below the transit plane proximate the intake end and a second spaced-away pleat below the transit plane proximate the discharge end. These spaced-away pleats partitioning the upper, food-product carrying run into an intake-end span and a discharge-end span cooperatively flanking a mid-span. Wherein the transfer conveyor additionally includes one scale servicing the intake-end span of the upper, food-product carrying run and another scale servicing the discharge-end span.

21 Claims, 16 Drawing Sheets

Related U.S. Application Data continuation-in-part of application No. 15/940,003, filed on Mar. 29, 2018, now Pat. No. 10,889,444.

(60) Provisional application No. 62/866,121, filed on Jun. 25, 2019, provisional application No. 62/648,613, filed on Mar. 27, 2018, provisional application No. 62/577,375, filed on Oct. 26, 2017, provisional application No. 62/560,392, filed on Sep. 19, 2017, provisional application No. 62/545,634, filed on Aug. 15, 2017, provisional application No. 62/478,822, filed on Mar. 30, 2017.

(51) Int. Cl.
*B65G 17/26* (2006.01)
*B65G 43/10* (2006.01)

(58) Field of Classification Search
CPC .......... A23G 1/54; A23G 3/0027; A23G 3/26; A23G 3/2076; A01N 59/16; A01N 2300/00; A01N 25/34; A61L 2/232; A23L 13/03; A01J 27/00; A01J 25/12; A22C 18/00
USPC ................... 99/352–356, 407–409, 485, 494
See application file for complete search history.

(56) References Cited

U.S. PATENT DOCUMENTS

| | | | | |
|---|---|---|---|---|
| 4,264,634 A | 4/1981 | Hochandel | | A23P 20/12 |
| 4,281,757 A | 8/1981 | Morton | | B65B 35/246 |
| 4,538,510 A | 9/1985 | Latimer | | B65G 17/08 |
| 4,604,704 A | 8/1986 | Eaves | | G06Q 10/08 |
| 4,852,475 A | 8/1989 | Yang | | A47J 37/1214 |
| 4,936,489 A * | 6/1990 | Blain | | A21C 15/002 |
| | | | | 198/771 |
| 4,966,072 A | 10/1990 | Ellis-Brown | | A21B 1/48 |
| 5,129,353 A | 7/1992 | Koppens | | A21C 9/04 |
| 5,172,636 A | 12/1992 | Theurer | | E01B 27/10 |
| 5,546,848 A | 8/1996 | Naramura | | A21C 9/04 |
| 5,741,536 A | 4/1998 | Mauer | | A23B 4/0056 |
| 5,846,046 A | 12/1998 | Warburton | | A01D 90/08 |
| 5,847,273 A | 12/1998 | Zubragel | | G01F 13/003 |
| 5,881,639 A | 3/1999 | Nesheim | | A01J 25/12 |
| 6,006,657 A | 12/1999 | Ikuta | | G07F 9/105 |
| 6,902,089 B2 | 6/2005 | Carnevali | | B60R 7/14 |
| 7,174,846 B2 | 2/2007 | Zeegers | | A23P 20/12 |
| 7,748,313 B2 * | 7/2010 | Tyndall | | A47J 37/044 |
| | | | | 99/407 |
| 7,954,446 B2 | 6/2011 | Nakane | | B05B 12/18 |
| 8,096,259 B1 * | 1/2012 | Nothum, Jr. | | A23P 20/12 |
| | | | | 118/308 |
| 8,651,015 B2 | 2/2014 | Zhu | | A23L 3/32 |
| 8,678,886 B1 | 3/2014 | Nothum, Jr. | | A22C 25/08 |
| 8,816,223 B2 | 8/2014 | Taylor | | A47J 37/12 |
| 10,471,619 B2 | 11/2019 | Hocker | | B26D 5/007 |
| 10,653,157 B2 | 5/2020 | Shell | | A22C 21/0053 |
| 10,834,947 B2 | 11/2020 | Rognini | | A23L 13/03 |
| 11,019,829 B2 | 6/2021 | Pfannenstiel | | A22C 15/00 |
| 2002/0015635 A1 | 2/2002 | Sinn | | B65G 41/008 |
| 2003/0008605 A1 | 1/2003 | Hartford | | A22C 18/00 |
| 2003/0079678 A1 | 5/2003 | Zeegers | | B05C 19/04 |
| 2004/0107845 A1 * | 6/2004 | Sunter | | B65B 1/46 |
| | | | | 99/534 |
| 2004/0123566 A1 | 7/2004 | Limousin | | B65B 53/063 |
| 2005/0155978 A1 * | 7/2005 | Parets | | G01G 19/22 |
| | | | | 222/1 |
| 2006/0292271 A1 | 12/2006 | King | | A23G 3/2076 |
| 2009/0223411 A1 | 9/2009 | Higgins | | D06M 13/51 |
| 2009/0294246 A1 | 12/2009 | Pogue | | B65G 17/28 |
| 2011/0244095 A1 * | 10/2011 | Sardo | | A23L 3/3508 |
| | | | | 426/302 |
| 2011/0311685 A1 | 12/2011 | Hogan et al. | | A23C 19/00 |
| 2012/0015101 A1 * | 1/2012 | O'Hara | | A23G 3/26 |
| | | | | 118/19 |
| 2012/0070553 A1 | 3/2012 | Hockett et al. | | A47J 37/12 |
| 2015/0053097 A1 | 2/2015 | Vardakostas | | A23P 20/20 |
| 2015/0239591 A1 | 8/2015 | Bialy | | B65G 37/00 |
| 2016/0088859 A1 | 3/2016 | Ream | | A23G 4/18 |
| 2016/0167888 A1 | 6/2016 | Messina | | B65G 41/00 |
| 2017/0050332 A1 * | 2/2017 | Bauer | | A22C 17/0093 |
| 2018/0186576 A1 | 7/2018 | Torrenga | | B65G 21/06 |
| 2019/0328027 A1 * | 10/2019 | Sunter | | A23P 20/18 |
| 2020/0205461 A1 | 7/2020 | Cohen | | A23P 20/12 |

FOREIGN PATENT DOCUMENTS

| | | | | |
|---|---|---|---|---|
| EP | 1 127 496 | 2/2000 | | A23L 1/31 |
| EP | 2 481 295 | 8/2012 | | A23L 1/00 |

* cited by examiner

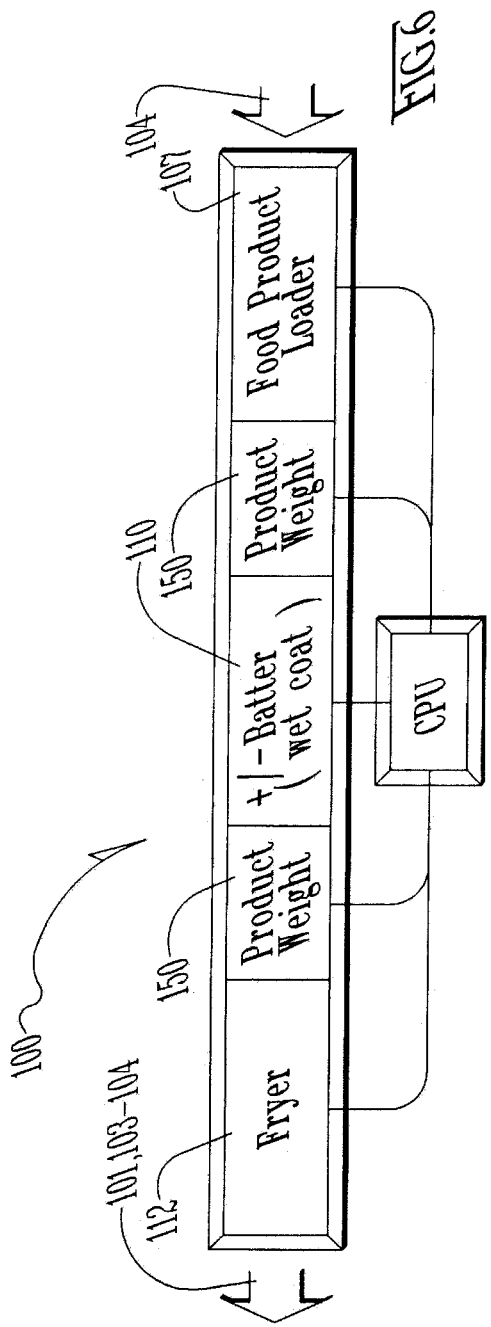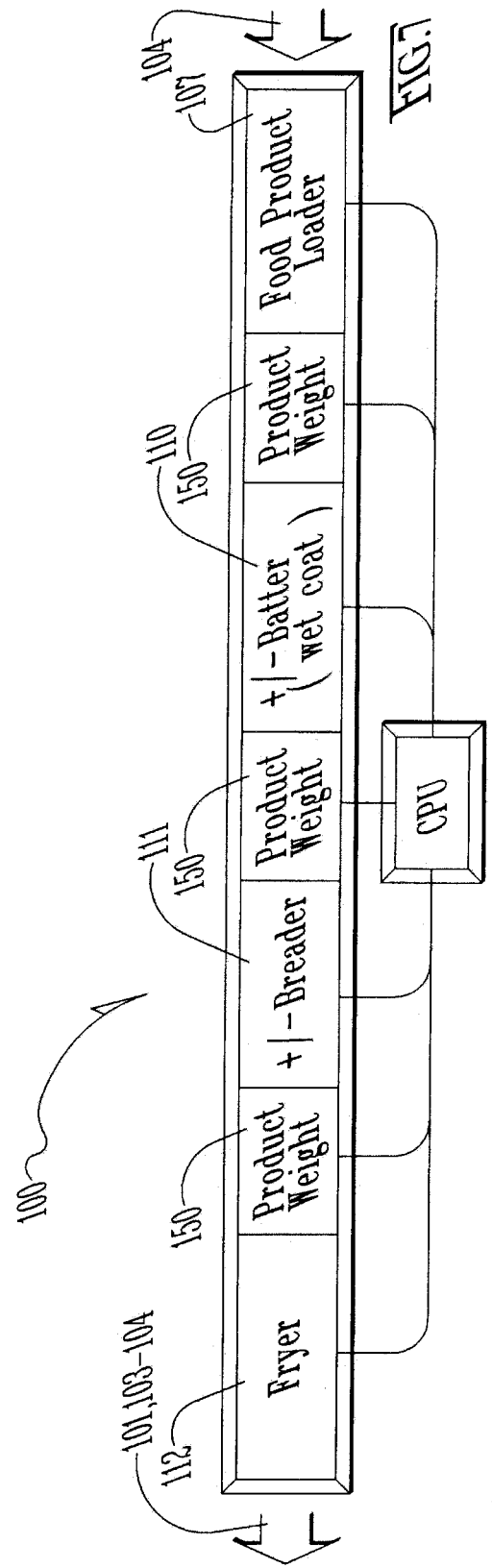

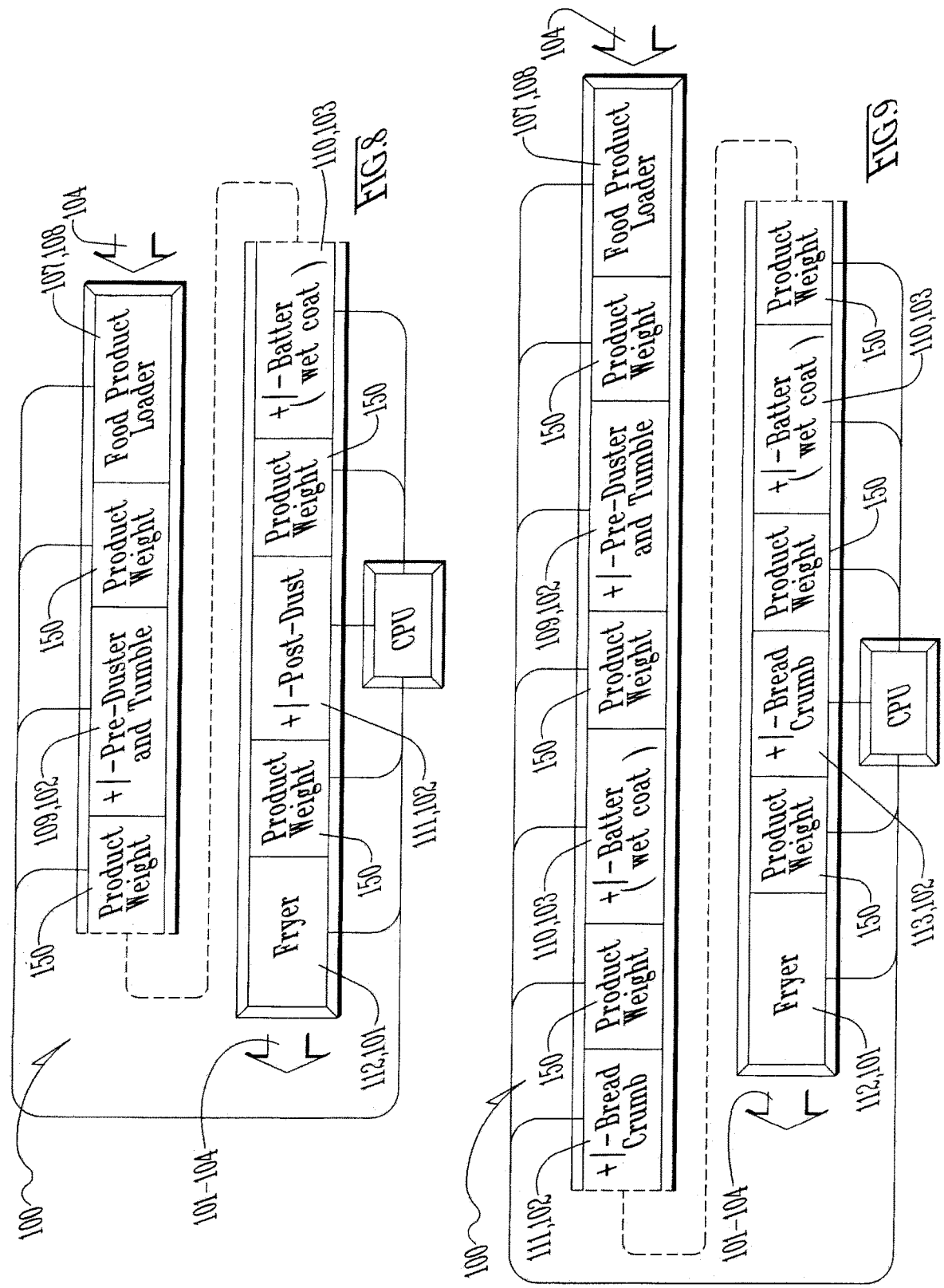

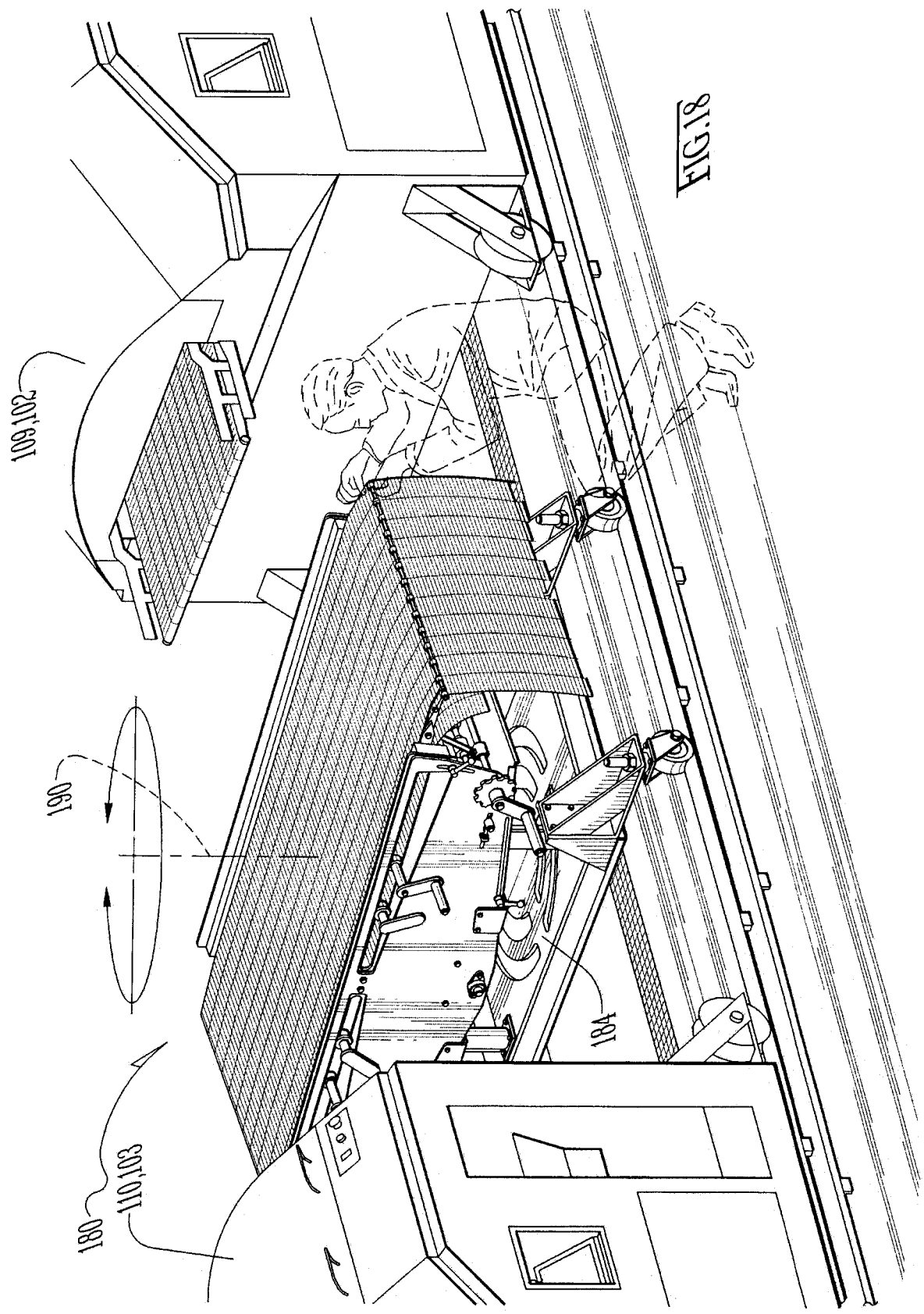

PRODUCTION FLOW-RATE MEASUREMENT OPTIONS FOR FOOD PROCESS LINES

CROSS-REFERENCE TO RELATED APPLICATION(S)

This application is a continuation of U.S. patent application Ser. No. 16/910,568, filed Jun. 24, 2020.

U.S. patent application Ser. No. 16/910,568, filed Jun. 24, 2020, claims the benefit of U.S. Provisional Application No. 62/866,121, filed Jun. 25, 2019.

U.S. patent application Ser. No. 16/910,568, filed Jun. 24, 2020, is also a continuation-in-part of U.S. patent application Ser. No. 15/940,003, filed Mar. 29, 2018, now U.S. Pat. No. 10,889,444; which claims the benefit of U.S. Provisional Application No. 62/478,822, filed Mar. 30, 2017; U.S. Provisional Application No. 62/545,634, filed Aug. 15, 2017; U.S. Provisional Application No. 62/560,392, filed Sep. 19, 2017; U.S. Provisional Application No. 62/577,375, filed Oct. 26, 2017; and U.S. Provisional Application No. 62/648,613, filed Mar. 27, 2018.

The foregoing patent disclosure(s) is(are) incorporated herein by this reference thereto.

BACKGROUND AND SUMMARY OF THE INVENTION

The invention generally relates to mechanized food-process line equipment for industrial food process plants and, more particularly, to production flow-rate measurement options for industrial food process plants.

It is an object of the invention to provide to production flow-rate measurement options for industrial food process plants other than doing so manually.

For example, a production instruction may come down to some responsible party, who will be generically referred to here as the supervisory attendant (eg., superintendent). In some small plants, this could actually be the owner.

A representative example of food process line machines (stations) 107-112 configured in a non-limiting example of a working food process line 100 might comprise the following sequence (note that the last four machines add coatings 101, 102, 103 and/or weight to the raw chicken tenders 104):

a food-product 104 (raw chicken tenders) load station 107 (see, eg., FIG. 12);
a food-product 104 spreading station 108 (see, eg., FIG. 12);
a pre-dust coating 102 coating machine 109 (now see, eg., FIG. 8);
a batter 103 batter-coating station 110 (see, eg., FIG. 8);
a bread-coating 102 coating machine 111 (see, eg., FIG. 8);
a fryer 112 providing a bath of hot oil 101 (see, eg., FIG. 8);

and so on. The fryer 112 might be set/limited to fry (par-fry) for a twenty-thirty second dwell time, which 'sets' the coatings 102, 103 for finished cooking later and elsewhere.

Assume the production instruction is to produce 100,000 'finished' pounds of coated/fried chicken tender product 101-104 over two consecutive 8-hour shifts (eg., start at 6:00 a.m. and run through the evening). The instruction further states that the percent of pick-up of the various coatings 101, 102, 103 is to be 30%. Hence the superintendent will need to have transferred out of refrigerated storage 114 (see FIG. 10) a total of 70,000 pounds of raw chicken tenders 104 (see FIG. 10), but over time and not all at once.

The production instruction is likely to be a lot more specific about the coatings pick-up. For example, the production instruction might specify:

3% pick-up of pre-dust 102 (eg., a dry coating);
10% pick-up of batter 103 (eg., a wet coating);
12% pick-up of final breading 102 (eg., again a dry coating); and
5% pick-up of oil 101.

The fryer 112 represents two distinct things that distinguish it from the other operations. First, the fryer 112 is usually the bottleneck for the production run. The throughput rate through the fryer 112 sets the flowrate value for the rest of the food process line 100. Second, the fryer 112 doesn't always add weight. The fryer 112 drives off moisture content and replaces that with oil 101 content. There might be a net-zero gain in weight pick-up, or else some net gain like up to about 10%.

Regardless, the foregoing represents an example production instruction.

A basic manner in which the superintendent monitors (or has monitored) whether the pick-up values are within specification is to do so manually. That is, a timed sample of flowing food product 104 is removed from the food process line 100 and weighed. Samples are obtained preferably before and after each coating machine 109-112. The samples are weighed on scales. The weight difference between the before and after samples allows calculation of pick-up percent. Each coating machine 109-112 (each coating process) affords various techniques for adjusting the percent up or down (several of the these techniques will be mentioned below). It might take about ten minutes to complete a round of manually sampling, weighing and adjusting. But for at least one snapshot in time, the set values should fairly well agree with the specified values in the production instruction.

However, the shortcomings (as distinct from the challenges) are numerous, and both the shortcomings and challenges jeopardize the chances of a successful run. The risks of an unsuccessful run is that the whole batch 101-104 will be downgraded, and bring a lower price (perhaps a much lower price) than if the whole batch 101-104 were deemed to have met the specification. So that's a loss of potential yield, a loss of potential profitability. It might even represent a plain stark net loss.

So again, it might take about ten minutes to complete a round of manually sampling, weighing and adjusting: which provides for, in at least one snapshot in time, an idea of the set values. The machines 109-112 may go out of specification as soon as the attendants walk away. The attendants might only take measurements once an hour to once a shift. Hence the food process line 100 could run outside of specification for a long time before anybody knew any different.

The superintendent is challenged right from the start to know the initial flowrate. FIG. 10 shows that the food processing plant is likely to have an on-site refrigerated storage 114 capable of storing the 70,000 pounds of raw chicken tenders 104 until called for. The raw chicken tenders 104 are stored in these bulk open-topped cubic vats 120 measuring four foot on a side with about 4,000-4,500 pounds capacity. The vats 120 are typically weighed and the weight thereof is labeled on each vat 120.

However, the weight of chicken tenders 104 is not the labeled weight minus the tare of the vat 120. The chicken tenders 104 in the vat 120 are originally covered in ice 106, which melts over time. Hence as FIG. 11 shows, the vats 120 are a slurry 104-106 of chicken tenders 104, ice 106 and meltwater 105. A vat labeled at 4,000 pounds might only actually contain just 3,200 pounds of chicken tenders 104.

Workers will typically shovel off the ice 106, but keep the meltwater 105. The vats 120 will be emptied into perhaps a first holding tank 122 (the vats 120 are typically plastic, but the holding tanks 122 are typically stainless steel). The chicken tender slurry 104-105 might then be moved to (pumped by a pump 124 into) a marinade tumbler 126, the goal being to drive in as much marinade 128 as possible. The marinade 128 can be liquid but is more likely to be powder, so retention of the meltwater 105 is useful. And the marinated product is pumped by pumps 124 into perhaps one or more further downstream holding tanks 132 until a last one functions as a hopper 134.

The manual way of determining initial start flowrate of raw chicken tenders 104 is to monitor the drop in the hopper 134. If the level drops six inches in a half hour, this might roughly correspond to 1,000 pounds. So that value corresponds to 2,000 pounds of raw tenders 104 input per hour, or perhaps 32,000 pounds over two shifts. The superintendent should order for a second food process line (not shown) to be run in tandem with this first food process line 100, and the values project that the two food process lines 100 together still will not achieve the target of 100,000 finished pounds of product 101-104 with 30% pick-up, per the production instruction.

Given the foregoing, it is an object of the invention to provide improvements and/or options to overcome some of the shortcoming and challenges of the prior art that were briefly sketched above.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 6 is top plan block diagram view of a given food process line in accordance with the invention and showing a weighing transfer conveyor as exemplified by FIG. 3 indicated in the diagram as a block identified as "PRODUCT WEIGHT;"

FIG. 7 is a top plan block diagram view comparable to FIG. 6 except showing a different assemblage of machines composing this FIG. 7 food process line;

FIG. 8 is a top plan block diagram view comparable to FIGS. 6 and 7 except showing still another different assemblage of machines composing this FIG. 8 food process line;

FIG. 9 is a top plan block diagram view comparable to FIGS. 6-8 except showing yet another different assemblage of machines composing this FIG. 9 food process line;

FIG. 18 is a perspective view comparable to FIG. 16 except showing the transfer conveyor in accordance with the invention situated between two machines which do not pivot and showing the transfer conveyor in accordance with the invention pivoted obliquely away from the main axis of the food process line.

DETAILED DESCRIPTION OF THE PREFERRED EMBODIMENTS

Figure 1:
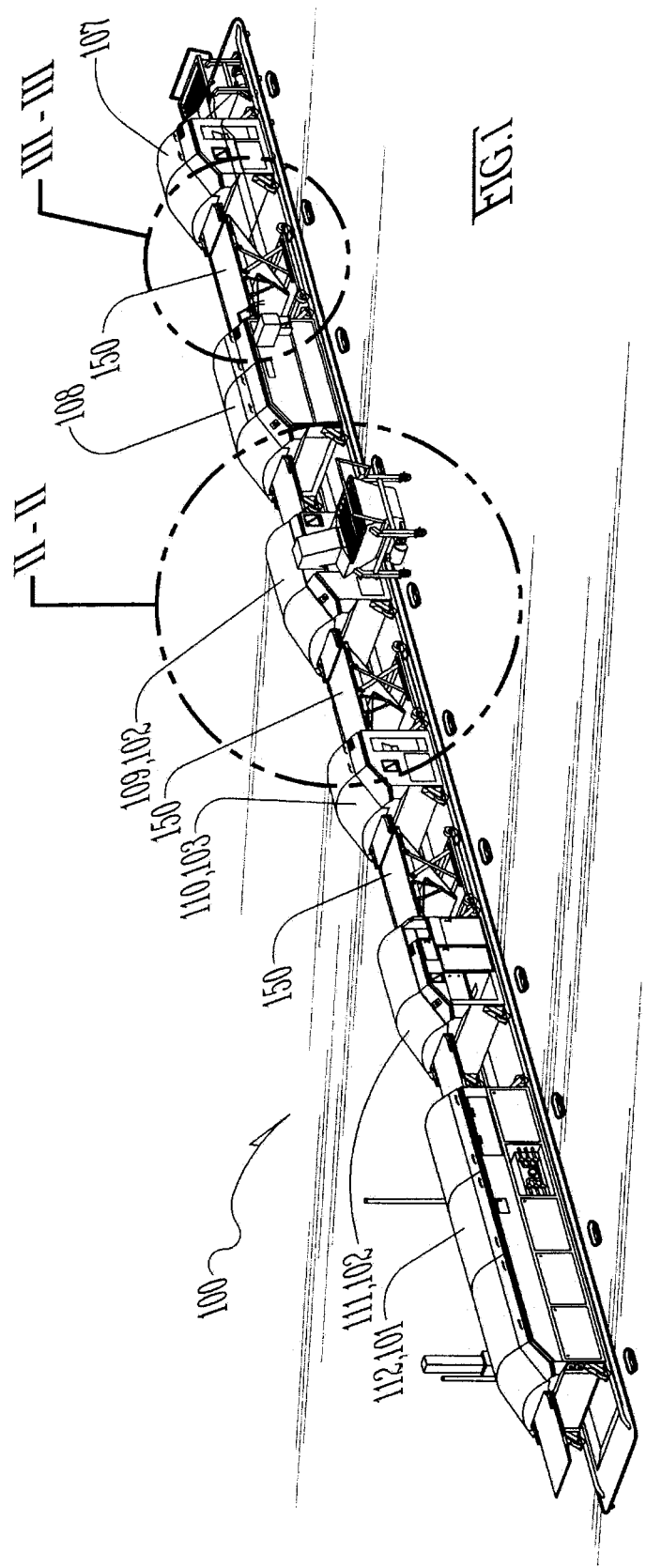
FIG. 1 is a perspective view of mechanized food-process line equipment arranged in such a working food process line and furnished with production flow-rate measurement options in accordance with the invention.
Figure 2:
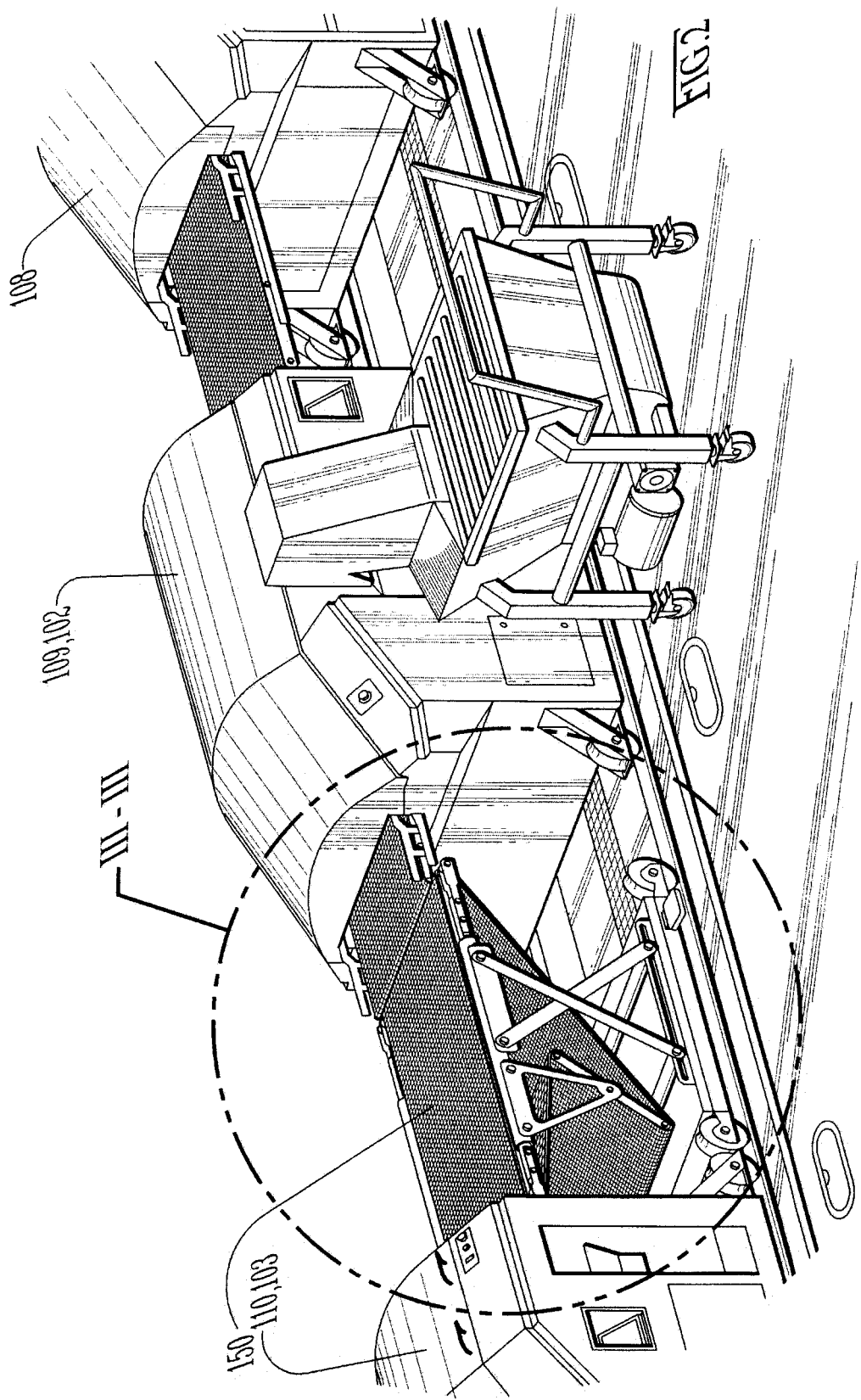
FIG. 2 is an enlarged scale perspective view of detail II-II in FIG. 1.
Figure 3:
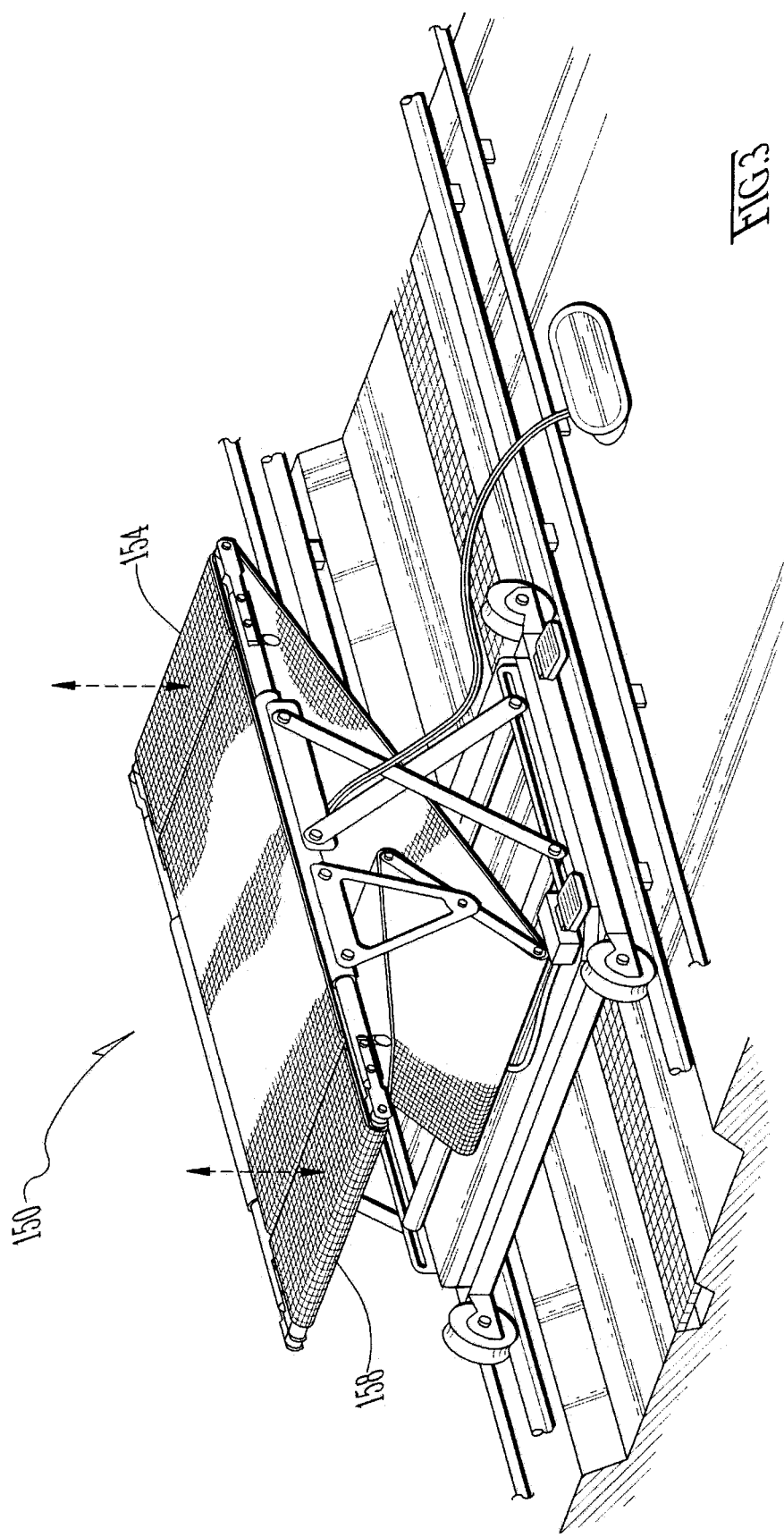
FIG. 3 is an enlarged scale perspective view of not only detail III-III in FIG. 1 but also detail III-III in FIG. 2 showing a first embodiment of a weighing transfer conveyor in accordance with the invention provisioned with scales at each nose end.

FIGS. 1 through 4 show a first embodiment of mechanized food-process line equipment arranged in a working food process line 100 and furnished with production flow-rate measurement options 150 in accordance with the invention. FIG. 5 is comparable to FIG. 4 except showing an alternate embodiment of a production flow-rate measurement option 150 in accordance with the invention.

To turn to FIG. 9, it shows in block diagram format a series of food process line machines 107-113 configured in a non-limiting example of a working food process line 100.

In series, from right to left, the machines in FIG. 9 comprise:

a food-product 104 load station 107;
a food-product 104 spreading station 108;
a weighing transfer conveyor 150;
a pre-dust coating 102 coating machine 109;
a weighing transfer conveyor 150;
a batter 103 batter-coating station 110;
a weighing transfer conveyor 150;
a seasoning 102 applying/coating machine 111;
a weighing transfer conveyor 150;
a batter 103 batter-coating station 110;
a weighing transfer conveyor 150;
a Panko-crumb 102 coating machine 142;
a weighing transfer conveyor 150;
a fryer 112 providing a bath of hot oil 101;

and so on. The fryer 112 might be set/limited to fry for a twenty-thirty second dwell time, which corresponds to a par-fry.

FIGS. 6-9 provide several non-limiting examples of food process line 100 configurations in accordance with the invention and show a like the series of stations/machines as outlined above.

It is an object of the invention to provide the supervisory attendant (superintendent) with weight-flow (~ mass-flow) of product across any weighing transfer conveyor 150 in accordance with the invention for real-time feedback of weight-flow values.

Figure 4:
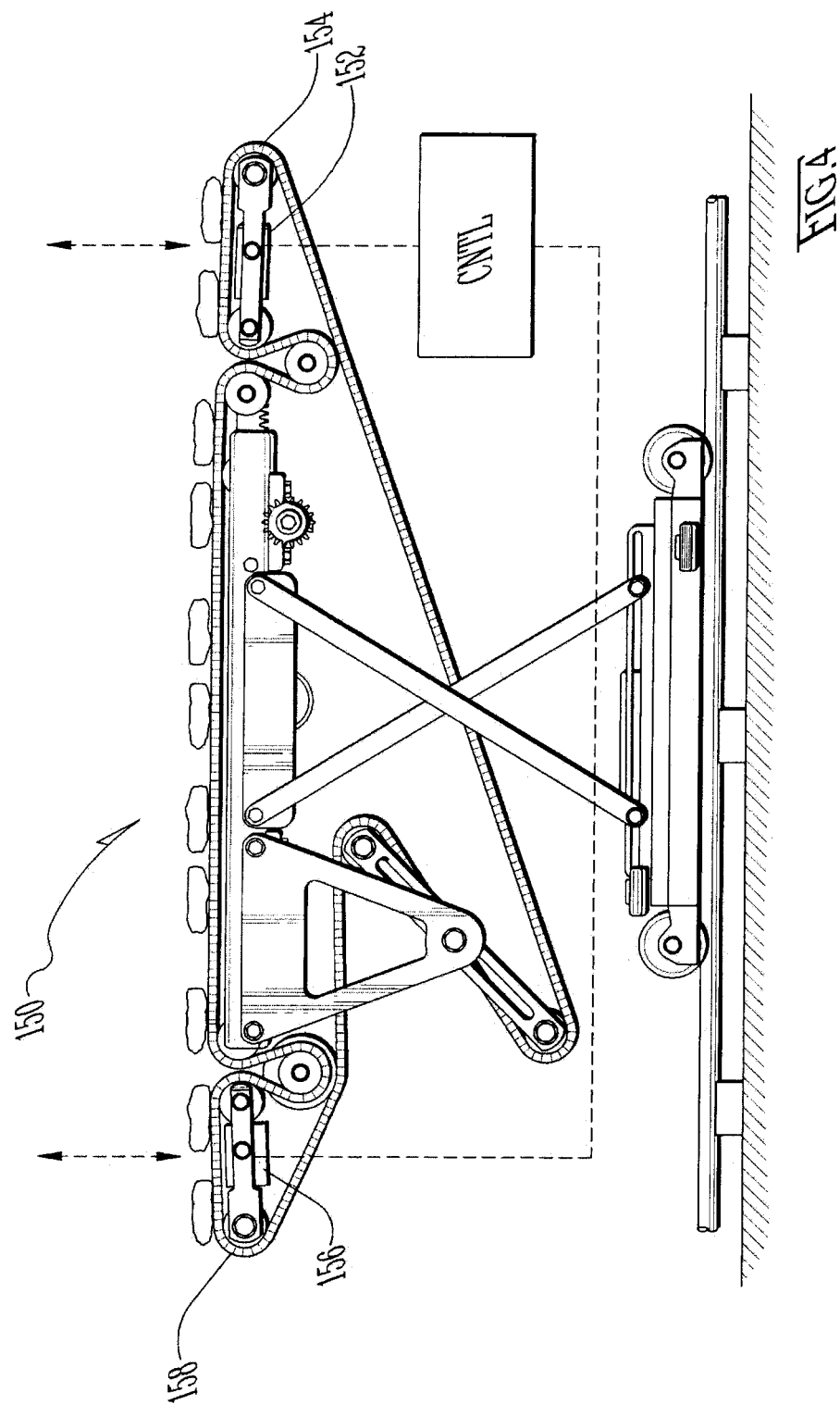
FIG. 4 is a side elevational view of FIG. 3, again showing the first embodiment of a weighing transfer conveyor in accordance with the invention, and as provisioned with scales at each nose end.
Figure 5:
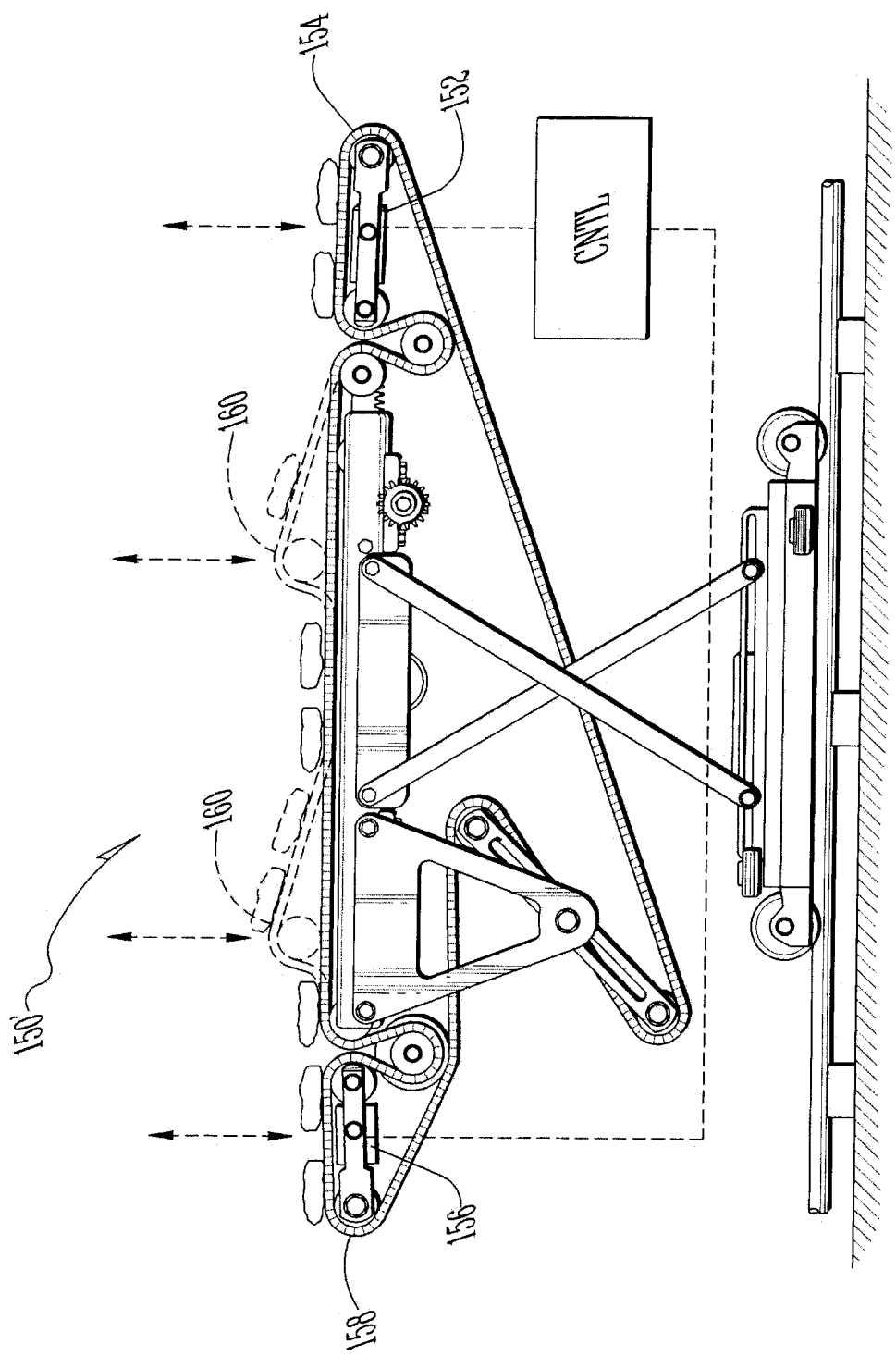
FIG. 5 is a side elevational view comparable to FIG. 4 except showing an alternate embodiment of a weighing transfer conveyor in accordance with the invention.

FIG. 4 shows a weighing transfer conveyor 150 in accordance with the invention. The weighing transfer conveyor 150 has scales 152 and 156 at both the intake end 154 (eg., to the right in the view) and outflow end 158 (to the left in the view). For example, the intake scale 152 might indicate that past one or another coating machine 109-113, there was a 5% pick-up of coating material 101-103. However, the outflow scale 156 might indicate that some coating material 101-103 shook off across the transit of the weighing transfer conveyor 150, showing that there was only a 4.8% pick-up of coating material remaining. This issue is not just limited to dry coating material 102, albeit it is more typical with dry coating material 102.

Preferably, several such weighing transfer conveyors 150 are used to space the various process machines 107-113 apart.

FIG. 5 is a side view comparable to FIG. 4 except showing an option with flip or agitation sections 160 so this could possibly remove some coating material (eg., 102) and then, when the proper weight pick-up is reached as specified in the production instruction, the food product 102, 104 conveyance is returned to a flat transit mode.

Hence the weighing conveyor 150 not only provides weight-flowrate measurements at both the intake and outflow nose end 154 and 158, the weighing conveyor 150 might be equipped with various provisions 160-163 to increase or decrease the pick-up percent.

The following techniques can be employed to adjust the pick-up percent. For dry particulate coatings 102, techniques which would increase pick-up percent include:

add more breading material 102 into the coating machine (eg., 111);
add finer breading material 102 into the coating machine (eg., 111);
use a compression roller 161 at the outflow;
increase the pressure of the compression roller 161;
turn down the flowrate of air knives 162 at the outflow;
add moisture 163' to the food product 104 at the inflow;
reduce/eliminate shaking/thumping/agitation 160 of the outflow; and so on.

For dry particulate coatings 102, techniques which would decrease pick-up percent include:

eliminate addition of moisture 163' to the food product 104 at the inflow;
decrease the pressure of the compression roller 161;
increase shaking/thumping/agitation 160 of the outflow to knock-off excess;
increase the blast from the air knifes 162 to blow-off excess; and so on.

For batter, a further technique for adjusting increase or decrease of pick-up percent includes thickening or thinning the batter 103. The batter 103 is readily made thicker by adding more powder. In the other direction, the batter 103 is readily made thinner by adding more water.

Figure 10:
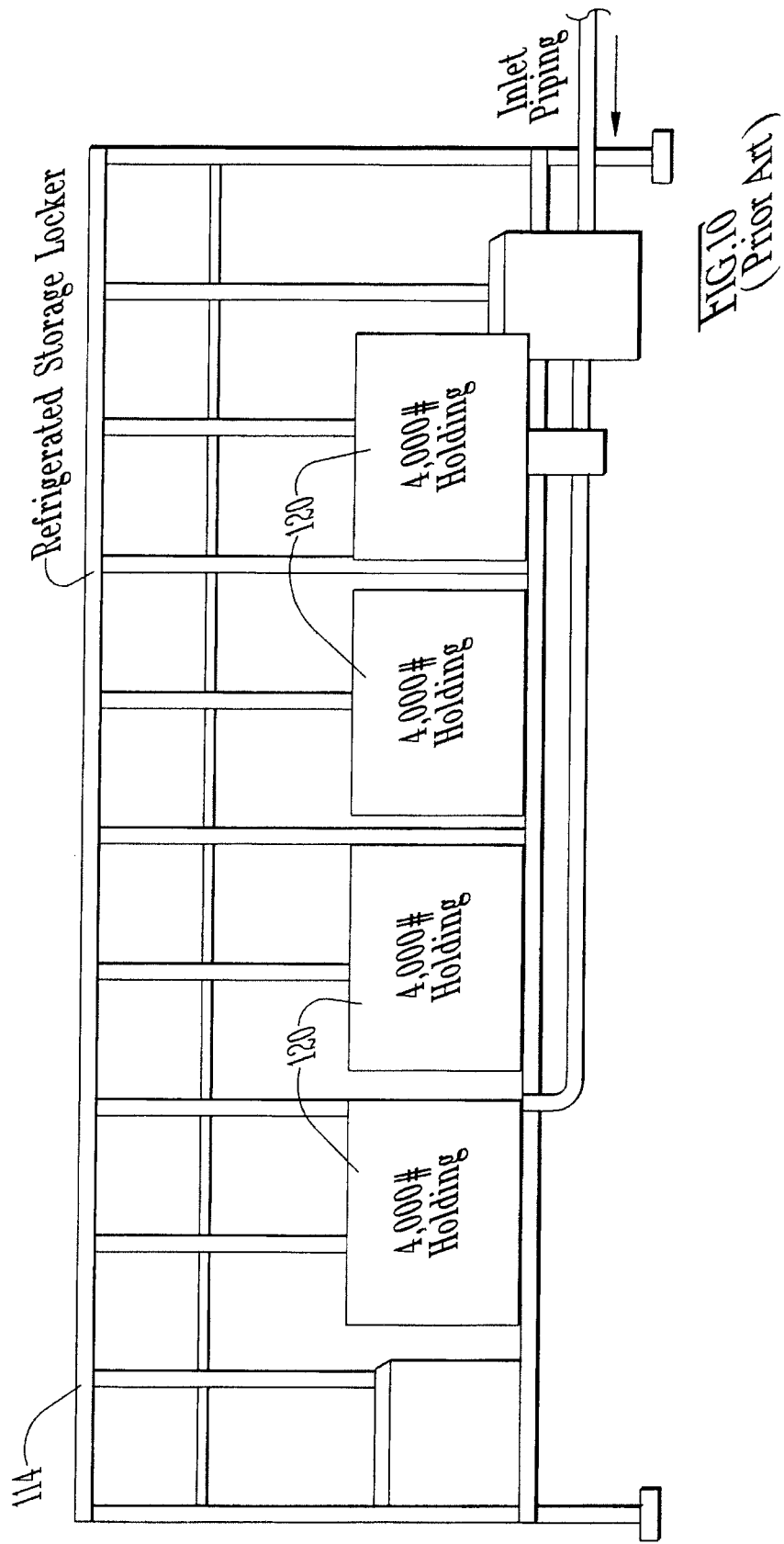
FIG. 10 is an elevational representation of a refrigerated storage locker in accordance with the prior art, situated inside a food processing factory (not shown) also in which resides a food process line in accordance with the invention, including any of the four non-limiting examples shown by FIGS. 6-9.
Figure 11:
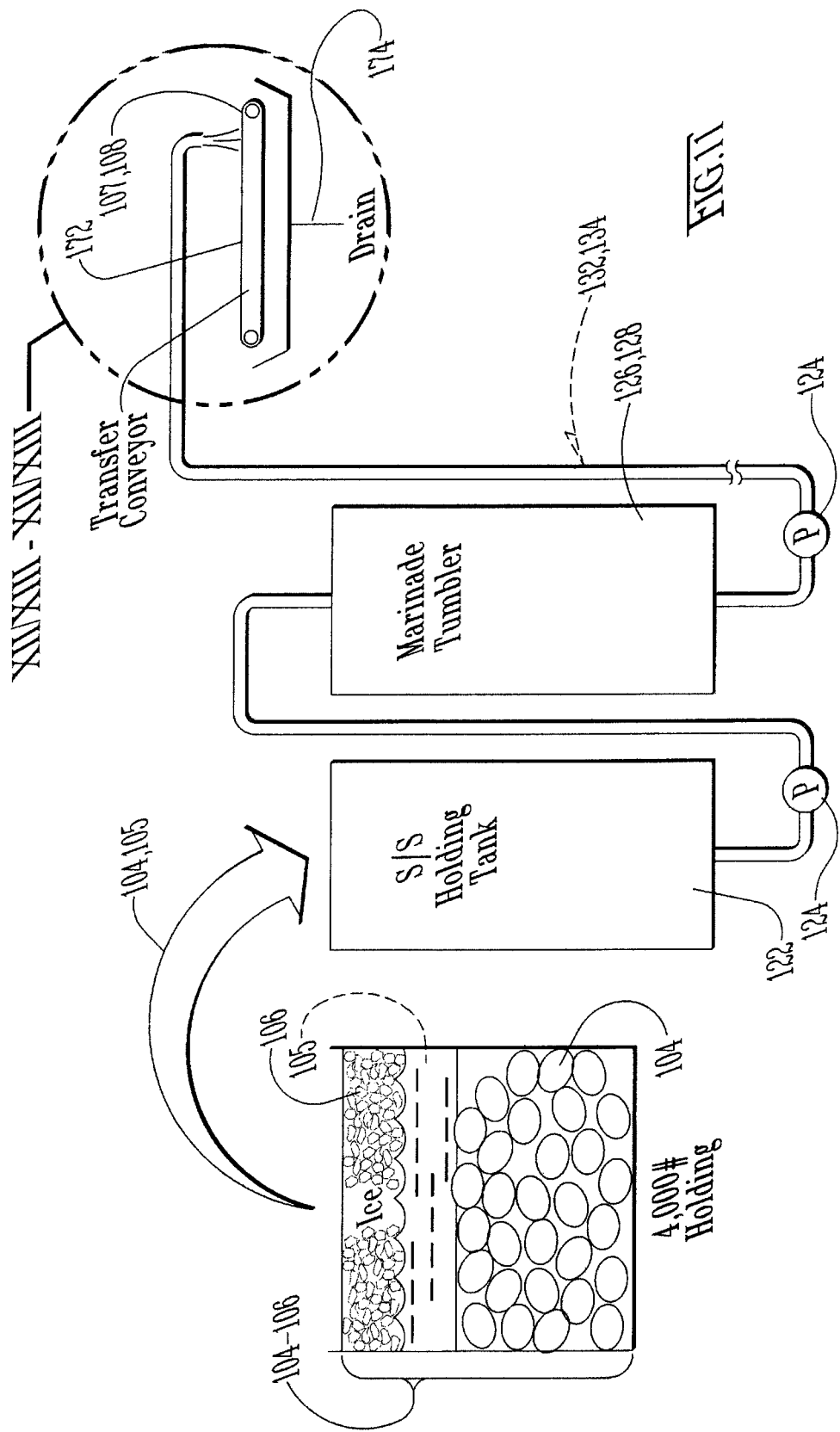
FIG. 11 is a block diagram showing an exemplary series of processes and operations that move batch-stored food product in the mass storage containers shown in FIG. 10 onto a loading zone of a food process line in accordance with the invention, including any of the four non-limiting examples shown by FIGS. 6-9.

FIG. 11 shows an exemplary series of processes and operations that move batch-stored food product in the vats 120 shown in FIG. 10 onto a loading zone 107 and/or 108 of a food process line 100. Ice 106 is preferably scooped/shoveled off the surface of the slurry 104-106 in the vats 120. The meltwater 105 is left behind with the chicken tenders 104. The vat 120 is poured/emptied likely into a holding tank 132 of some sorts at the start. The contents of the holding tank 132 are pumped (by a pump 124) into a marinade tumbler 126. The meltwater 105 is put to good use to dissolve the powdered marinade 128. The outflow of the marinade tumbler 126 is pumped/poured onto a landing conveyor 107 and/or 108 of some sort. The landing conveyor 107 and/or 108 will be of an open construction 172 like a chain link belt, or drag link belt and so on. The excess water 105 at this point is allowed to flow through the belt 172 and into an underlying drain 174. Food product 104 has hence landed onto the initial inflow end of the food process line 100.

Figure 12:
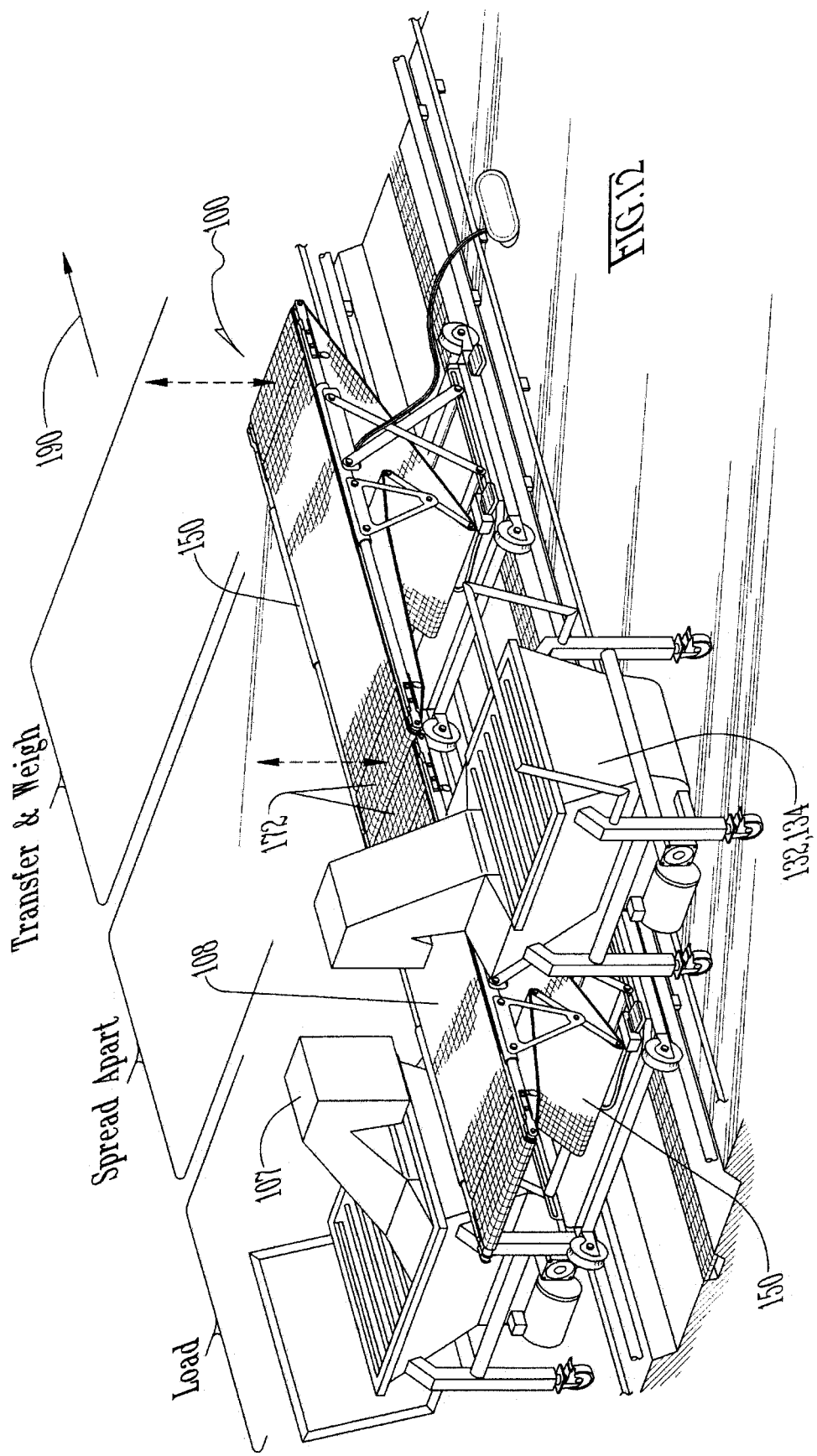
FIG. 12 is a perspective view functionally representing detail XII/XIII-XII/XIII in FIG. 11, showing one version of operations where a food product loader in accordance with the prior art is loading food product (which food product is not in view) onto a landing conveyor in accordance the prior art, which landing conveyor affords implementation of some form of product spreading technology whether it be manual or otherwise, and which landing conveyor discharges to a weighing transfer conveyor in accordance with the invention.

FIG. 12 shows one version of what can functionally transpire in detail XII/XIII-XII/XIII in FIG. 11. A food product loader 107 in accordance with the prior art is loading food product (which food product is not visible in the view) onto a landing conveyor 107 and/or 108 also in accordance the prior art. The landing conveyor 107 and/or 108 affords a longitudinal run of conveyor transit which allows some implementation of some form of product spreading technology. This can be manual. Typically two to three workers would stand on each side of the conveyor 107 and/or 108 and move product 104 apart so that single pieces are not touching each other. There are other options to accomplish this which are not manual.

Here in FIG. 12, the landing conveyor 107 and/or 108 discharges to a weighing transfer conveyor 150 in accordance with the invention, and the weight-flowrate measured here is the inflow flowrate of raw chicken tenders 104. The flowrate can be adjusted practically immediately at start-up to the max flowrate of the 'bottleneck' of the food process line 100. This was mentioned above to be nearly always the maximum throughput flowrate through the fryer 112.

Figure 13:
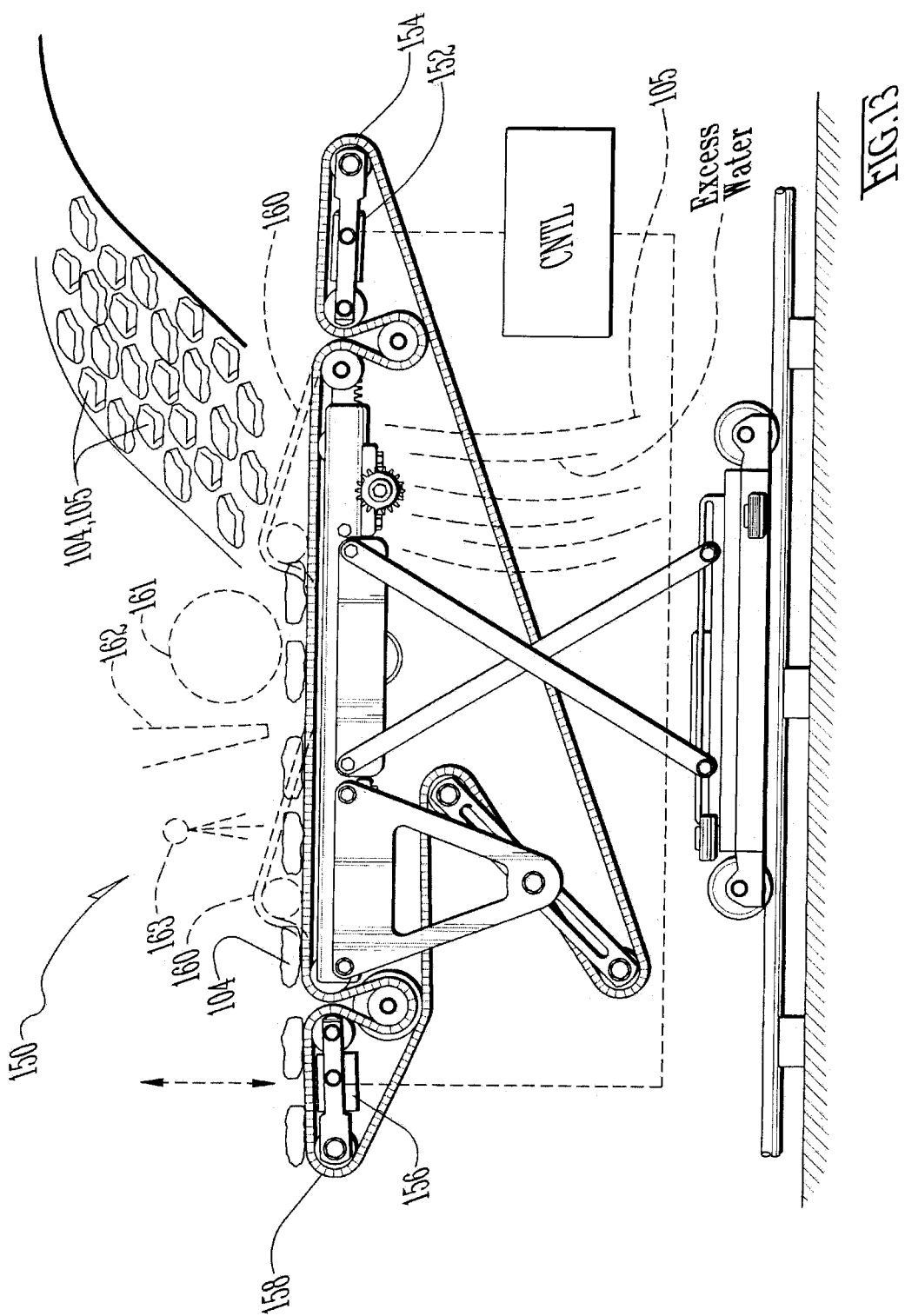
FIG. 13 is a side elevational view comparable to FIG. 4 and providing an alternate functional representation of detail XII/XIII-XII/XIII in FIG. 11, showing another version of operations where the loading of raw food product is directly onto a weighing transfer conveyor in accordance with the invention, it likewise having a mid-span which affords implementation of some form of product spreading technology whether it be manual or otherwise.

FIG. 13 shows an alternate option to FIG. 12. FIG. 13 is a side elevational view comparable to FIG. 4 and providing an alternate functional representation of detail XII/XIII-XII/XIII in FIG. 11.

Here in FIG. 13, the loading of raw food product is poured/pumped directly onto a weighing transfer conveyor 150 in accordance with the invention. Wherein the weighing transfer conveyor 150 likewise has a mid-span which affords implementation of some form of product spreading technology, whether it be manual or otherwise.

For weighing conveyors 150 situated before or after coating apparatus 109-113, the mid-span can accommodate the mounting of some technology like thumpers/shakers/agitators 160 for knocking off excess coating material (eg., 102), or air knives 162 for blowing off excess coating material (eg., 102), or else compression rollers 161 for driving in the particulate to increase retention, misters 163 to moisten the product 104 and so on.

Figure 14:
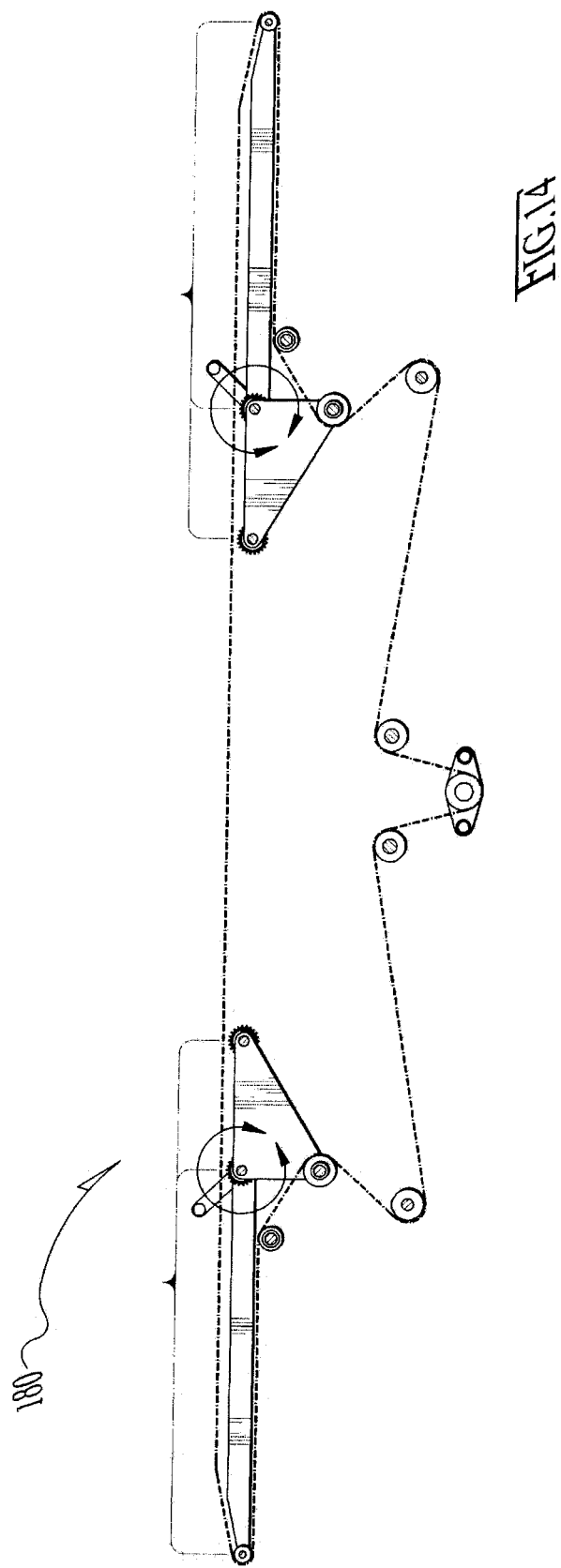
FIG. 14 is a schematic side elevation view of a further embodiment of a weighing transfer conveyor in accordance with the invention, shown in an expanded position.
Figure 15:
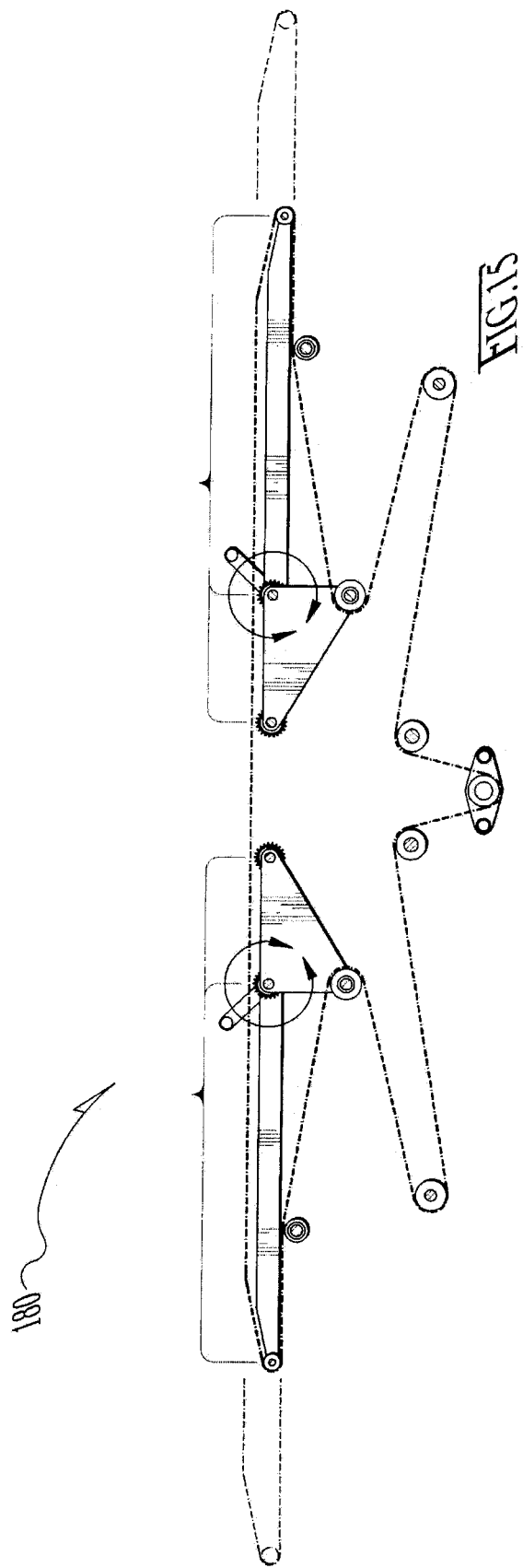
FIG. 15 is a schematic side elevation view comparable to FIG. 14 except showing the further embodiment of a weighing transfer conveyor in accordance with the invention in a contracted position.

FIGS. 14 and 15 are schematic side elevation views of a further embodiment of a weighing transfer conveyor 180 in accordance with the invention. FIG. 14 shows this weighing transfer conveyor 180 in an expanded position. FIG. 15 shows this weighing transfer conveyor 180 in a contracted position.

Figure 16:
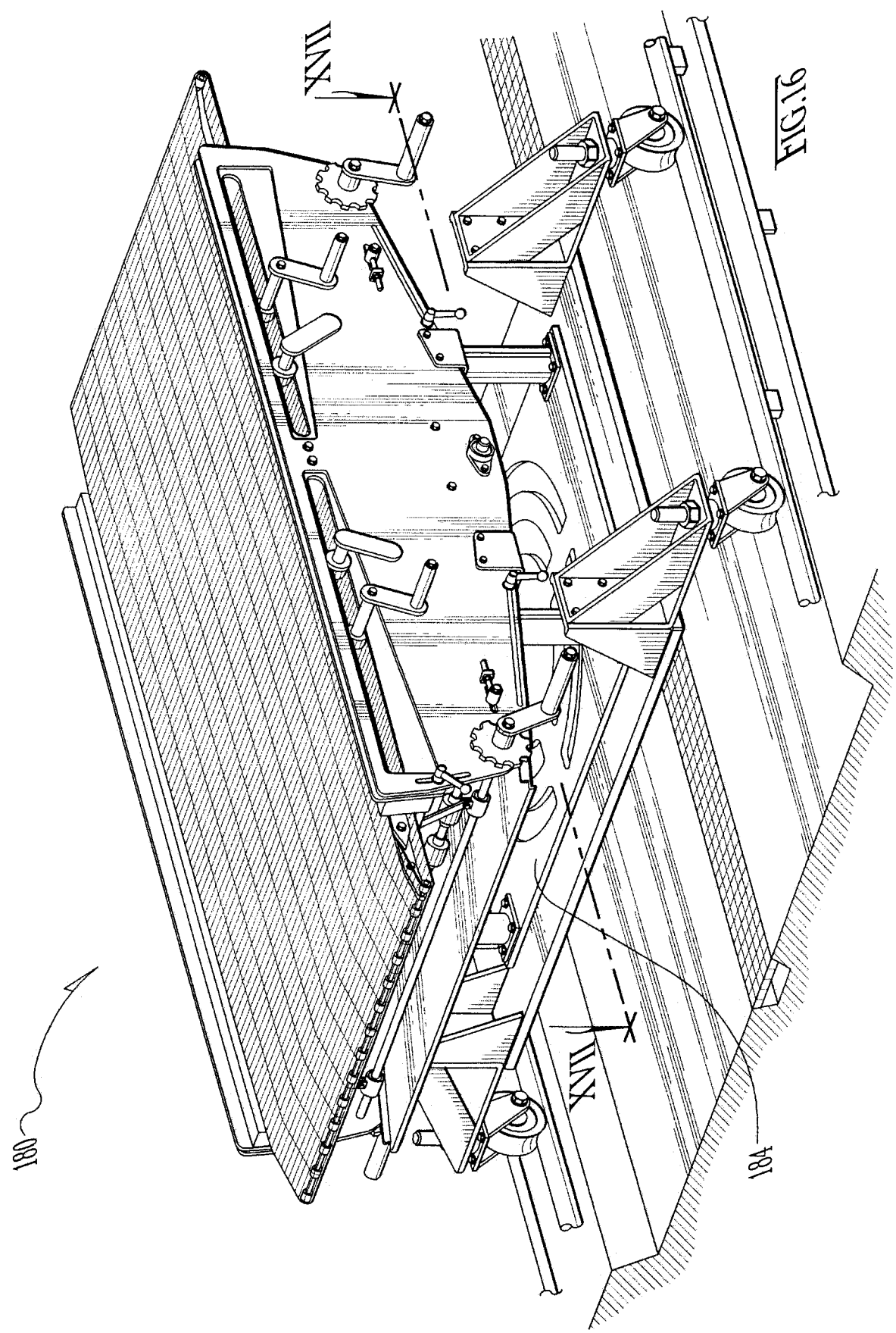
FIG. 16 is a perspective view of this further embodiment of a weighing transfer conveyor in accordance with the invention, showing that it further allows pivoting about a vertical axis in addition to being reversibly expanding-contracting.

FIG. 16 shows that this further embodiment of a weighing transfer conveyor 180 allows pivoting about a vertical axis in addition to being reversibly expanding-contracting.

Figure 17:
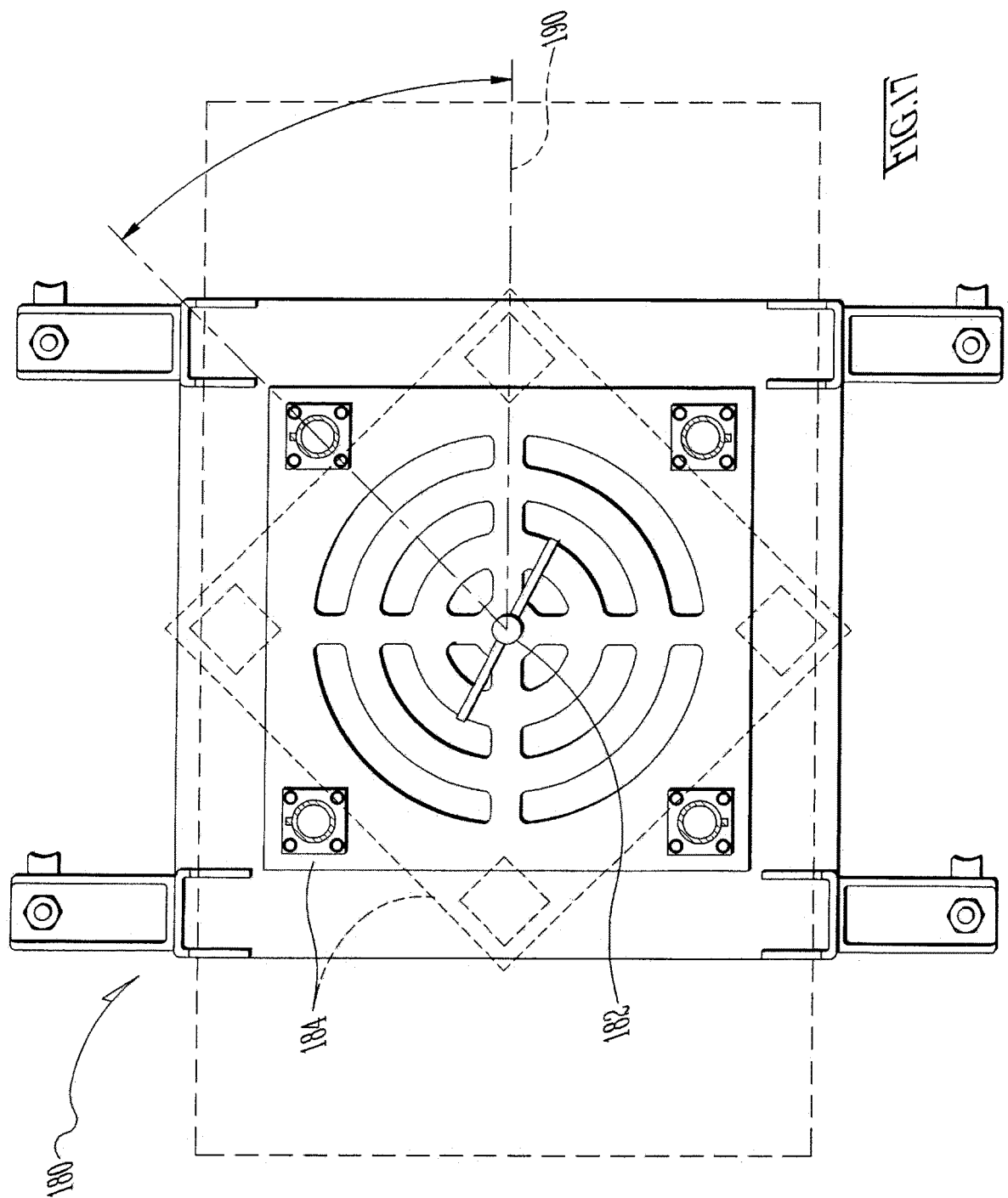
FIG. 17 is a top plan view, partly in section, taken in the direction of arrows XVII-XVII in FIG. 16.

FIG. 17 is a top plan view, partly in section, taken in the direction of arrows XVII-XVII in FIG. 16, showing aspect of the pivot hardware 182 and turntable 184.

FIG. 18 is a perspective view comparable to FIG. 16 except showing the transfer conveyor 180 situated between two machines which do not pivot (any of 107-113) and showing the transfer conveyor 180 pivoted obliquely away from the main axis 190 of the food process line 100.

The role for pivoting is not during production run time, but during down time. The advantages of pivoting enable cleaning and/or maintenance operations without breaking apart the food process line 100 as a whole.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method of determining in a mechanized food-process line a weight pick-up or loss value of a flowrate of food product pieces through a selected food-process line machine; said method comprising the steps of:
    providing three machines in series comprising a weighing inflow transfer conveyor, the selected food-process line machine, and a weighing outflow transfer conveyor;
    each transfer conveyor comprising an endless conveyor belt having an upper, food-product carrying run and a lower, return run;
    conveying an inflow of food product pieces in one state of processing on the upper, food-product carrying run of the weighing inflow transfer conveyor;
    inputting the inflow of food product pieces in the one state of processing into the selected food-process line machine;
    performing at least one operation on the food product pieces in the selected food-process line machine so as to transform the food product pieces from the one state to a second state;
    conveying an outflow of food product pieces from the selected food-process line machine on the upper, food-product carrying run of the weighing outflow transfer conveyor;
    providing a monitoring machine;
    the weighing inflow transfer conveyor providing the monitoring machine with a weight-flow flowrate value of the inflow of food product pieces;
    the weighing outflow transfer conveyor providing the monitoring machine with a weight-flow flowrate value of the outflow of food product pieces;
    the monitoring machine differencing the value provided by the weighing outflow transfer conveyor and the value provided by the weighing inflow transfer conveyor and whereby, with the value provided by the weighing inflow transfer conveyor, determining the weight pick-up or loss percent of the flowrate of food product pieces through the selected food-process line machine.

2. The method of claim 1, wherein:
the food product pieces comprise any of:
    chicken tenders;
    other pieces of chicken; or
    pieces of other meats.

3. The method of claim 2, wherein:
the one state of the food product pieces conveying on the upper, food-product carrying run of the weighing inflow transfer conveyor comprises any of:
    raw;
    coated in a dry coating;
    coated in a wet coating; or
    coated in any combination of at least one dry coating and at least one wet coating; or optionally also in addition to any of the above;
    par-fried.

4. The method of claim 1, wherein:
the one state of the food product pieces conveying on the upper, food-product carrying run of the weighing inflow transfer conveyor comprises any of:
    raw;
    coated in a dry coating;
    coated in a wet coating; or
    coated in any combination of at least one dry coating and at least one wet coating; or optionally also in addition to any of the above;
    par-fried.

5. The method of claim 4, wherein:
the food product pieces conveying on the upper, food-product carrying run of the weighing outflow transfer conveyor are characterized by the second state; and
further wherein:
    when the one state is raw food product and the second state comprises the raw food product coated in a dry coating, the weight pick-up or loss percent presumptively corresponds to a weight pick-up percent of dry coating;
    when the one state is raw food product and the second state comprises the raw food product coated in a wet coating, the weight pick-up or loss percent presumptively corresponds to a weight pick-up percent of wet coating;
    when the one state is raw food product coated in a dry coating and the second state comprises the raw food product as coated in the dry coating and as further coated in a wet coating, the weight pick-up or loss percent presumptively corresponds to a weight pick-up percent of wet coating;

when the one state is raw food product successively coated in a dry coating and then a wet coating and the second state comprises the raw food product as successively coated in the dry coating and then the wet coating and as further coated in a further dry coating, the weight pick-up or loss percent presumptively corresponds to a weight pick-up percent of further dry coating; or when the one state is raw food product coated or not in any combination of at least one dry coating and/or at least one wet coating and the second state comprises the raw food product coated or not in any combination of the at least one dry coating and/or the at least one wet coating and as further outflowing from a hot oil bath fryer, the weight pick-up or loss percent presumptively corresponds to a weight pick-up or loss percent of the difference between the oil content gained and the moisture content given off.

6. The method of claim 1, wherein:

the upper, food-product carrying run of the weighing outflow transfer conveyor is elongated between spaced nose ends, one being an upline nose end and the other a downline nose end;

the weighing outflow transfer conveyor being provisioned with spaced dual output-provisions of weight-flow flowrate values, one of the output-provisions of weight-flow flowrate values being proximate the upline nose end of the weighing outflow transfer conveyor and the other of the output-provisions of weight-flow flowrate values being proximate the downline nose end of the weighing outflow transfer conveyor; and the upline provision of the weighing outflow transfer conveyor providing weight-flow flowrate values to the monitoring machine with an upline weight-flow flowrate value of the outflow of food product pieces out from the selected food-processing machine whereby this upline value is used by the monitoring machine for determining the weight pick-up or loss percent of the flowrate of food product pieces through the selected food-process line machine.

7. The method of claim 6, further comprising the steps of:

the downline provision of the weighing outflow transfer conveyor providing weight-flow flowrate values to the monitoring machine with a downline weight-flow flowrate value of the inflow of food product pieces therepast; and the monitoring machine differencing the downline value provided by the weighing outflow transfer conveyor and the upline value provided by the weighing outflow transfer conveyor and whereby, with the upline value provided by the weighing outflow transfer conveyor, determining the weight pick-up or loss percent of the flowrate of food product pieces across the weighing outflow transfer conveyor between the upline provision of the weighing outflow transfer conveyor for providing weight-flow flowrate values and the downline provision of the weighing outflow transfer conveyor for providing weight-flow flowrate values.

8. A method of determining in a mechanized food-process line a weight pick-up or loss value of a flowrate of food product pieces through various food-process line machines; said method comprising the steps of:

providing a mechanized food-process line that comprises at least five machines in series conveying food product pieces from an upline to downline direction, the five machines in series comprising in the upline to downline direction:

a first weighing transfer conveyor,
a first food-process line machine,
a second weighing transfer conveyor,
a second food-process line machine, and
a third weighing transfer conveyor;

each transfer conveyor comprising an endless conveyor belt having an upper, food-product carrying run and a lower, return run;

conveying an inflow of food product pieces in a first state of processing on the upper, food-product carrying run of the first weighing transfer conveyor;

inputting the inflow of food product pieces in the first state of processing into the first food-process line machine;

performing at least one operation on the food product pieces in the first food-process line machine so as to transform the food product pieces from the first state to a second state;

conveying an outflow of food product pieces from the first food-process line machine on the upper, food-product carrying run of the second weighing transfer conveyor;

providing a monitoring machine;

the first weighing transfer conveyor providing the monitoring machine with a weight-flow flowrate value of the inflow of food product pieces into the first food-processing machine;

the second weighing transfer conveyor providing the monitoring machine with a weight-flow flowrate value of the outflow of food product pieces out from the first food-processing machine;

the monitoring machine differencing the value provided by the first weighing transfer conveyor and the value provided by the second weighing transfer conveyor and whereby, with the value provided by the first weighing transfer conveyor, determining the weight pick-up or loss percent of the flowrate of food product pieces through the first food-process line machine;

the second weighing transfer conveyor inputting the flow of food product pieces thereacross in the second state and inputting the flow into the second food-process line machine;

performing no less than a single operation on the food product pieces in the second food-process line machine so as to transform the food product pieces from the second state to a third state;

conveying an outflow of food product pieces from the second food-process line machine on the upper, food-product carrying run of the third weighing transfer conveyor;

the second weighing transfer conveyor providing the monitoring machine with a weight-flow flowrate value of the inflow of food product pieces into the second food-processing machine;

the third weighing transfer conveyor providing the monitoring machine with a weight-flow flowrate value of the outflow of food product pieces out from the second food-processing machine;

the monitoring machine differencing the value provided by the second weighing transfer conveyor and the value provided by the third weighing transfer conveyor and whereby, with the value provided by the second weighing transfer conveyor, determining the weight pick-up or loss percent of the flowrate of food product pieces through the second food-process line machine.

9. The method of claim 8, wherein:

the monitoring machine further comprises a feedback control system; and said method further comprises the steps of:

providing the feedback control system with a target weight pick-up or loss percent for the flowrate of food product pieces out of the first food-process line machine;

the feedback control system determining a pick-up or loss percent error between the target weight pick-up or loss percent for the flowrate of food product pieces through the first food-process line machine and the monitoring machine determined weight pick-up or loss percent therefor;

the feedback control system undertaking adjustment measures to bring the monitoring machine determined weight pick-up or loss percent therefor in closer agreement with the target weight pick-up or loss percent therefor;

such adjustment measures comprising any of:
  adjusting the dwell time of the food product pieces within the first food-process line machine;
  when the first food-process line machine applies a dry coating, replenishing the depleted dry coating material with a finer or coarser dry coating material accordingly;
  when the first food-process line machine applies a wet coating, thickening or thinning the wet coating material accordingly;
  when the adjustment measure is selected to transpire over the second weighing transfer conveyor, providing the second weighing transfer conveyor with air knives aimed at the flowing food product transiting over the upper, food-product carrying run thereof and adjust up, down or switch off a flowrate of air out the air knives;
  when the adjustment measure is selected to transpire over the second weighing transfer conveyor, providing the upper, food-product carrying run of the second weighing transfer conveyor with agitation provisions and adjust up, down or switch off a level of intensity of the agitation provisions as the food product pieces flow thereacross;
  when the adjustment measure is selected to transpire over the second weighing transfer conveyor, providing the second weighing transfer conveyor with a compression roller rolling over the flowing food product pieces transiting over upper, food-product carrying run thereof and adjusting an increase, decrease of lift off a level of pressure of the compression roller over the flowing food product pieces passing thereunder; or
  when the adjustment measure is selected to transpire over the second weighing transfer conveyor, providing the second weighing transfer conveyor with moisture misters aimed at the flowing food product transiting over upper, food-product carrying run thereof and adjust up, down or switch off a flowrate of the moisture out of moisture misters.

10. The method of claim 9, further comprises the steps of:
providing the feedback control system with a target weight pick-up or loss percent for the flowrate of food product pieces out of the second food-process line machine;

the feedback control system determining a pick-up or loss percent error between the target weight pick-up or loss percent for the flowrate of food product pieces through the second food-process line machine and the monitoring machine determined weight pick-up or loss percent therefor;

said feedback control system undertaking second-in-sequence adjustment measures to bring the monitoring machine determined weight pick-up or loss percent for the second food-process line machine in closer agreement with the target weight pick-up or loss percent for the second food-process line machine;

such second-in-sequence adjustment measures comprising any of:
  adjusting the dwell time of the food product pieces within the second food-process line machine;
  when the second food-process line machine applies a dry coating, replenishing the depleted dry coating material with a finer or coarser dry coating material accordingly;
  when the second food-process line machine applies a wet coating, thickening or thinning the wet coating material accordingly;
  when the second-in-sequence adjustment measure is selected to transpire over the third weighing transfer conveyor, providing the third weighing transfer conveyor with air knives aimed at the flowing food product transiting over the upper, food-product carrying run thereof and adjust up, down or switch off a flowrate of air out the air knives;
  when the second-in-sequence adjustment measure is selected to transpire over the third weighing transfer conveyor, providing the upper, food-product carrying run of the third weighing transfer conveyor with agitation provisions and adjust up, down or switch off a level of intensity of the agitation provisions as the food product pieces flow thereacross;
  when the second-in-sequence adjustment measure is selected to transpire over the third weighing transfer conveyor, providing the third weighing transfer conveyor with a compression roller rolling over the flowing food product pieces transiting over upper, food-product carrying run thereof and adjusting an increase, decrease of lift off a level of pressure of the compression roller over the flowing food product pieces passing thereunder; or
  when the second-in-sequence adjustment measure is selected to transpire over the third weighing transfer conveyor, providing the third weighing transfer conveyor with moisture misters aimed at the flowing food product transiting over upper, food-product carrying run thereof and adjust up, down or switch off a flowrate of the moisture out of moisture misters.

11. The method of claim 10, wherein:
the upper, food-product carrying run of the second weighing transfer conveyor is elongated between spaced nose ends, one being an upline nose end and the other a downline nose end;

the second weighing transfer conveyor being provisioned with spaced dual output-provisions of weight-flow flowrate values, one of the output-provisions of weight-flow flowrate values being proximate the upline nose end of the second weighing transfer conveyor and the other of the output-provisions of weight-flow flowrate values being proximate the downline nose end of the second weighing transfer conveyor;

the upline provision of the second weighing transfer conveyor providing weight-flow flowrate values to the monitoring machine with an upline weight-flow flowrate value of the outflow of food product pieces out from the first food-processing machine whereby this upline value is used by the monitoring machine for determining the weight pick-up or loss percent of the flowrate of food product pieces through the first food-process line machine.

12. The method of claim 11, further comprising the steps of:
the monitoring machine differencing the downline value provided by the second weighing transfer conveyor and the upline value provided by the second weighing transfer conveyor and whereby, with the upline value provided by the second weighing transfer conveyor, determining the weight pick-up or loss percent of the flowrate of food product pieces across the second weighing transfer conveyor between the upline provision of the second weighing transfer conveyor for providing weight-flow flowrate values and the downline provision of the second weighing transfer conveyor for providing weight-flow flowrate values.

13. The method of claim 12, wherein:
the food product pieces comprise any of:
chicken tenders;
other pieces of chicken; or
pieces of other meats; and
wherein various states of the food product pieces conveying on the upper, food-product carrying run of the first, second or third weighing transfer conveyor comprises any of:
raw;
coated in a dry coating;
coated in a wet coating; or
coated in any combination of at least one dry coating and at least one wet coating.

14. The method of claim 8, wherein:
the upper, food-product carrying run of the second weighing transfer conveyor is elongated between spaced nose ends, one being an upline nose end and the other a downline nose end;
the second weighing transfer conveyor being provisioned with spaced dual output-provisions of weight-flow flowrate values, one of the output-provisions of weight-flow flowrate values being proximate the upline nose end of the second weighing transfer conveyor and the other of the output-provisions of weight-flow flowrate values being proximate the downline nose end of the second weighing transfer conveyor;
the upline provision of the second weighing transfer conveyor providing weight-flow flowrate values to the monitoring machine with an upline weight-flow flowrate value of the outflow of food product pieces out from the first food-processing machine whereby this upline value is used by the monitoring machine for determining the weight pick-up or loss percent of the flowrate of food product pieces through the first food-process line machine; and
the downline provision of the second weighing transfer conveyor providing weight-flow flowrate values to the monitoring machine with a downline weight-flow flowrate value of the inflow of food product pieces into the second food-processing machine whereby this downline value is the value is used by the monitoring machine for determining the weight pick-up or loss percent of the flowrate of food product pieces through second food-process line machine.

15. The method of claim 14, further comprising the steps of:
the monitoring machine differencing the downline value provided by the second weighing transfer conveyor and the upline value provided by the second weighing transfer conveyor and whereby, with the upline value provided by the second weighing transfer conveyor, determining the weight pick-up or loss percent of the flowrate of food product pieces across the second weighing transfer conveyor between the upline provision of the second weighing transfer conveyor for providing weight-flow flowrate values and the downline provision of the second weighing transfer conveyor for providing weight-flow flowrate values.

16. A method of determining in a mechanized food-process line a weight pick-up or loss value of a flowrate of food product pieces transiting across a weighing transfer conveyor; said method comprising the steps of:
providing in series a relatively upline food-process line coating machine and a relatively downline weighing transfer conveyor;
the weighing transfer conveyor comprising an endless conveyor belt having an upper, food-product carrying run and a lower, return run;
the upper, food-product carrying run of the weighing transfer conveyor being elongated between spaced nose ends, one being an upline nose end and the other a downline nose end;
the weighing transfer conveyor being provisioned with spaced dual output-provisions of weight-flow flowrate values, one of the output-provisions of weight-flow flowrate values being proximate the upline nose end of the weighing transfer conveyor and the other of the output-provisions of weight-flow flowrate values being proximate the downline nose end of the weighing transfer conveyor;
inputting an inflow of food product pieces into the relatively upline food-process line coating machine;
conveying an outflow of food product pieces from the relatively upline food-process line coating machine on the upper, food-product carrying run of the weighing transfer conveyor;
providing a monitoring machine;
the upline provision of the weighing transfer conveyor providing weight-flow flowrate values to the monitoring machine with an upline weight-flow flowrate value of the outflow of food product pieces out from the relatively upline food-processing coating machine;
the downline provision of the weighing transfer conveyor providing weight-flow flowrate values to the monitoring machine with a downline weight-flow flowrate value of the inflow of food product pieces therepast; and
the monitoring machine differencing the downline value provided by the downline provision of the weighing transfer conveyor and the upline value provided by the upline provision of the weighing transfer conveyor and whereby, with the upline value provided by the upline provision of the weighing transfer conveyor, determining the weight pick-up or loss percent of the flowrate of food product pieces across the weighing transfer conveyor between the upline provision of the weighing transfer conveyor for providing weight-flow flowrate values and the downline provision of the weighing transfer conveyor for providing weight-flow flowrate values.

17. The method of claim 16, wherein:
the food product pieces comprise any of:
chicken tenders;
other pieces of chicken; or
pieces of other meats; and wherein various states of the food product pieces conveying on the upper, food-product carrying run of the weighing transfer conveyor comprises any of:
raw;
coated in a dry coating;
coated in a wet coating; or
coated in any combination of at least one dry coating and at least one wet coating.

18. The method of claim 17, wherein:
the monitoring machine further comprises a feedback control system; and
said method further comprises the steps of:
providing the monitoring machine with a weight-flow flowrate value of the inflow of food product pieces into the relatively upline food-process line coating machine;
providing the feedback control system with a target weight pick-up or loss percent for the flowrate of food product pieces out of the relatively upline food-process line coating machine;
the feedback control system determining a pick-up or loss percent error between the target weight pick-up or loss percent for the flowrate of food product pieces through the relatively upline food-process line machine and the monitoring machine determined weight pick-up or loss percent therefor;
wherein with the monitoring machine already provided with (1) weight-flow flowrate value of the inflow of food product pieces into the relatively upline food-process line coating machine, (2) the upline value provided by the upline provision of the weighing transfer conveyor and (3) the downline value provided by the downline provision of the weighing transfer conveyor, as well as already (4) differencing the downline value provided by the downline provision of the weighing transfer conveyor for determining the weight pick-up or loss percent of the flowrate of food product pieces across the weighing transfer conveyor between the upline provision of the weighing transfer conveyor for providing weight-flow flowrate values and the downline provision of the weighing transfer conveyor for providing weight-flow flowrate values, in consequence thereof the feedback control system undertaking adjustment measures to bring the monitoring machine determined weight pick-up or loss percent therefor in closer agreement with the target weight pick-up or loss percent for the relatively upline food-process line coating machine;
the adjustment measures comprising any of providing the weighing transfer conveyor with:
air knives aimed at the flowing food product transiting over the upper, food-product carrying run thereof and adjust up, down or switch off a flowrate of air out the air knives;
agitation provisions and adjust up, down or switch off a level of intensity of the agitation provisions as the food product pieces flow thereacross;
a compression roller rolling over the flowing food product pieces transiting over upper, food-product carrying run thereof and adjusting an increase, decrease of lift off a level of pressure of the compression roller over the flowing food product pieces passing thereunder; or
moisture misters aimed at the flowing food product transiting over upper, food-product carrying run thereof and adjust up, down or switch off a flowrate of the moisture out of moisture misters.

19. The method of claim 16, wherein the weighing transfer conveyor further comprises:
a turret comprising a central body flanked between one movably mounted assembly for holding out the upline nose roller relative to the central body and another movably mounted assembly for holding out the downline nose roller likewise relative to the central body;
wherein the movably mounted assemblies are movable between extended and retracted extremes wherein cooperatively the movably mounted assemblies are movable to hold out the respective nose rollers thereof in relative extended and retracted extremes giving the upper food-product carrying run respective extended and retracted states.

20. The method of claim 19, wherein the weighing transfer conveyor further comprises:
a carriage with pivot hardware pivotally propping the turret above the carriage;
wherein said weighing transfer conveyor can pivot in place to thereby give better access to both said weighing transfer conveyor and the relatively upline food process line coating machine for washing and/or maintenance operations.

21. The method of claim 16, wherein the weighing transfer conveyor further comprises:
a central body having an upline side and a downline side and further having on either the upline or downline side a movable bracket for holding out one or the other of the nose ends relative to the central body;
said central body being mounted with course-changing hardware for supporting and tensioning the endless conveyor belt, said course-changing hardware including the spaced nose ends between which define the upper, food-product carrying run;
said movable bracket having extension and retraction strokes that correspondingly give the one or the other nose end an extended position or a retracted position relative the central body.

* * * * *